United States Patent [19]

Athey et al.

[11] 4,445,537

[45] May 1, 1984

[54] BOILER FEED WATER DEAERATOR SPRAY VALVE TURBULENCE SHIELD

[75] Inventors: Roderick E. Athey, Overland Park, Kans.; Alan G. Furnish, Kansas City, Mo.

[73] Assignee: Marley Company, Mission Woods, Kans.

[21] Appl. No.: 424,878

[22] Filed: Sep. 30, 1982

Related U.S. Application Data

[63] Continuation-in-part of Ser. No. 307,330, Oct. 1, 1981.

[51] Int. Cl.³ .................... E03B 11/00; B01D 19/00
[52] U.S. Cl. ........................... 137/572; 137/574; 137/575; 137/576; 137/590; 137/543; 55/39
[58] Field of Search .............. 137/541, 542, 543, 572, 137/574, 575, 576, 590; 251/147, 154, 155; 55/39, 194

[56] References Cited

U.S. PATENT DOCUMENTS

| | | | |
|---|---|---|---|
| 1,776,613 | 9/1930 | Baker | 137/541 |
| 2,405,241 | 8/1946 | Smith | 137/542 |
| 2,671,524 | 3/1954 | Gilwood | 55/39 |
| 2,677,433 | 5/1954 | Kretzschmar | 55/39 |
| 2,689,018 | 9/1954 | Kittredge | 55/39 |
| 2,714,896 | 8/1955 | Knautz | 137/576 |
| 3,112,191 | 11/1963 | Anderson | 55/194 |
| 3,432,139 | 3/1969 | Jentoft | 251/147 |
| 3,487,611 | 1/1970 | Bekedam | 55/39 |

*Primary Examiner*—Alan Cohan
*Assistant Examiner*—John A. Rivell
*Attorney, Agent, or Firm*—Schmidt, Johnson, Hovey & Williams

[57] ABSTRACT

An improved boiler feed water deaerator is provided which includes a plurality of spray valve assemblies therein which are shielded to effectively eliminate undesirable valve chattering and vibrations resulting from the horizontal component of incoming feed water and turbulent water flow through the valves. The valves hereof include an elongated, tubular, open ended water flow-directing shield with a shiftable valve plug adjacent the outlet end thereof. The plug is secured to an elongated stem disposed axially within the shield, and support structure is provided for the stem adjacent the upper inlet of the shield for permitting reciprocation and limited pivoting movement of the stem and plug. The ratio of the internal diameter to the length of the shield is desirably less than about 2 (most preferably about 1) in order to assure that water entering the inlet end of the body is directed substantially axially prior to discharge; this has been found to measurably reduce turbulence in the water and hence minimize potentially destructive valve vibration.

11 Claims, 7 Drawing Figures

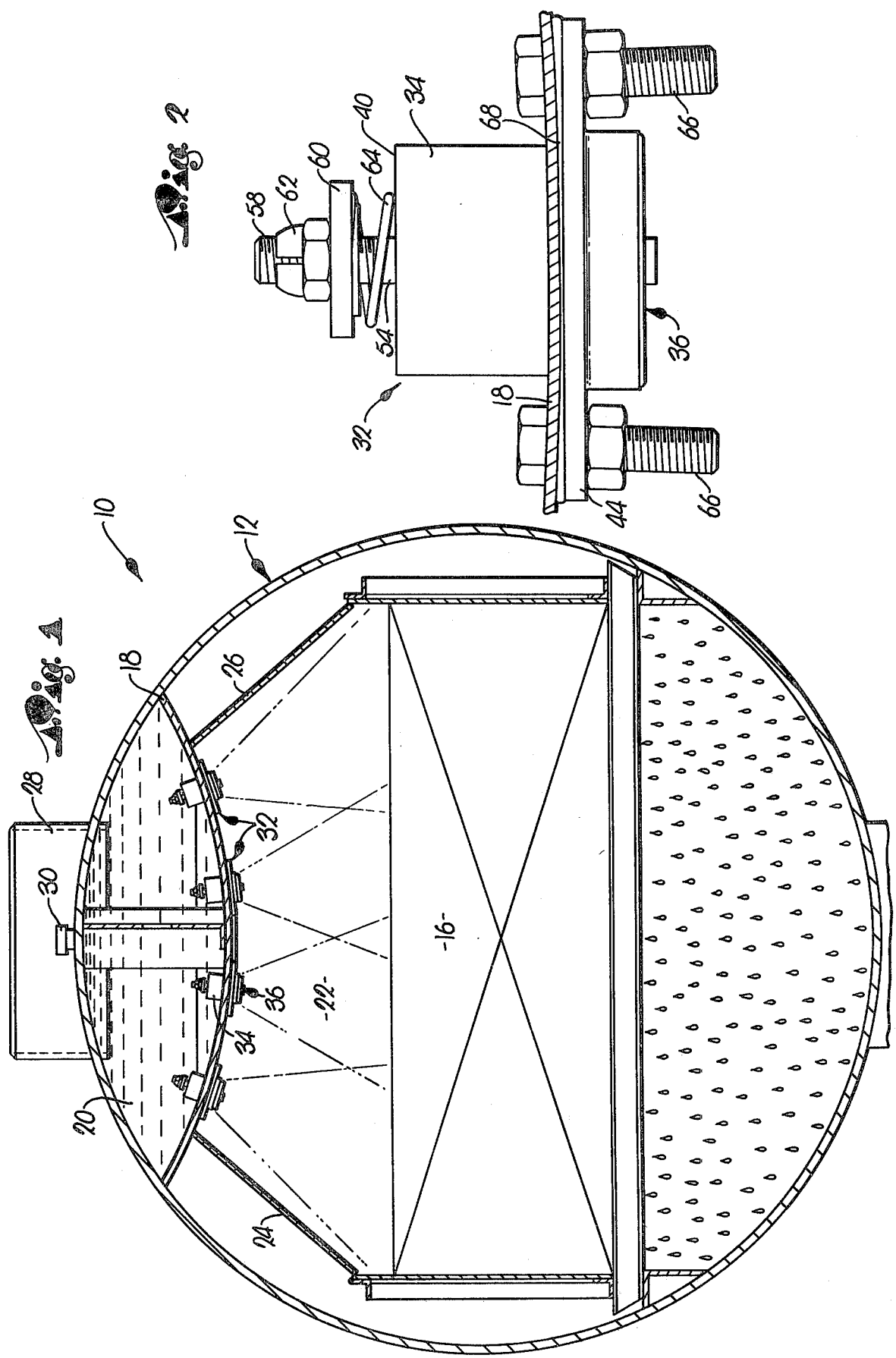

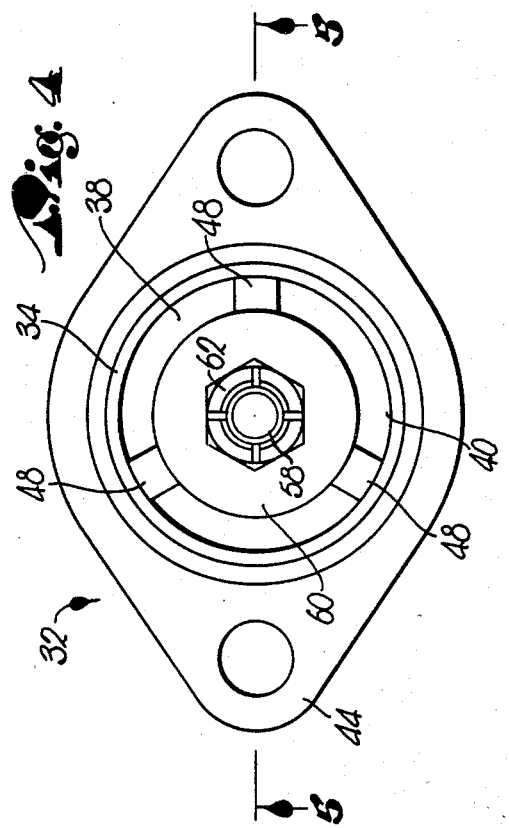
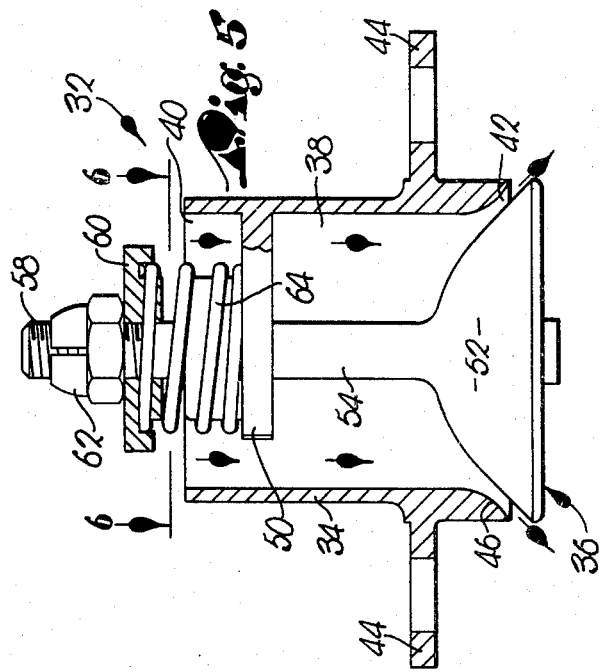
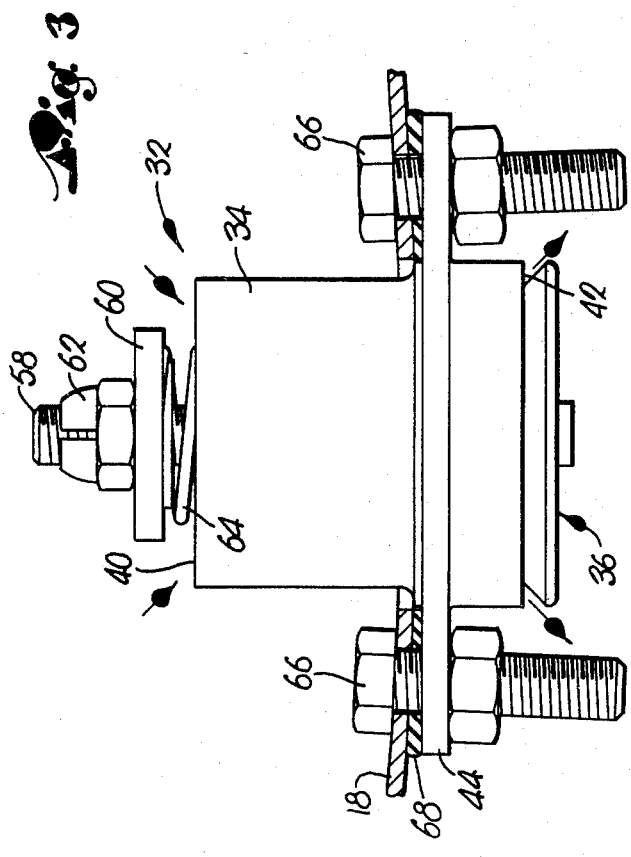
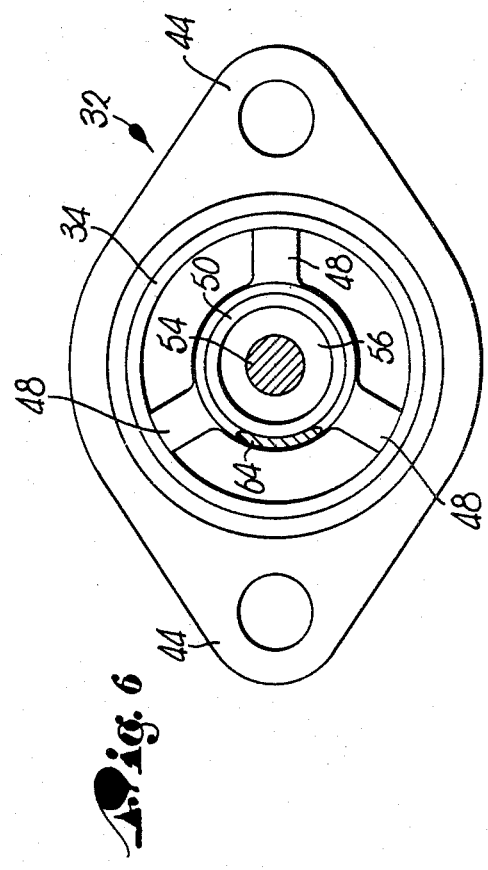

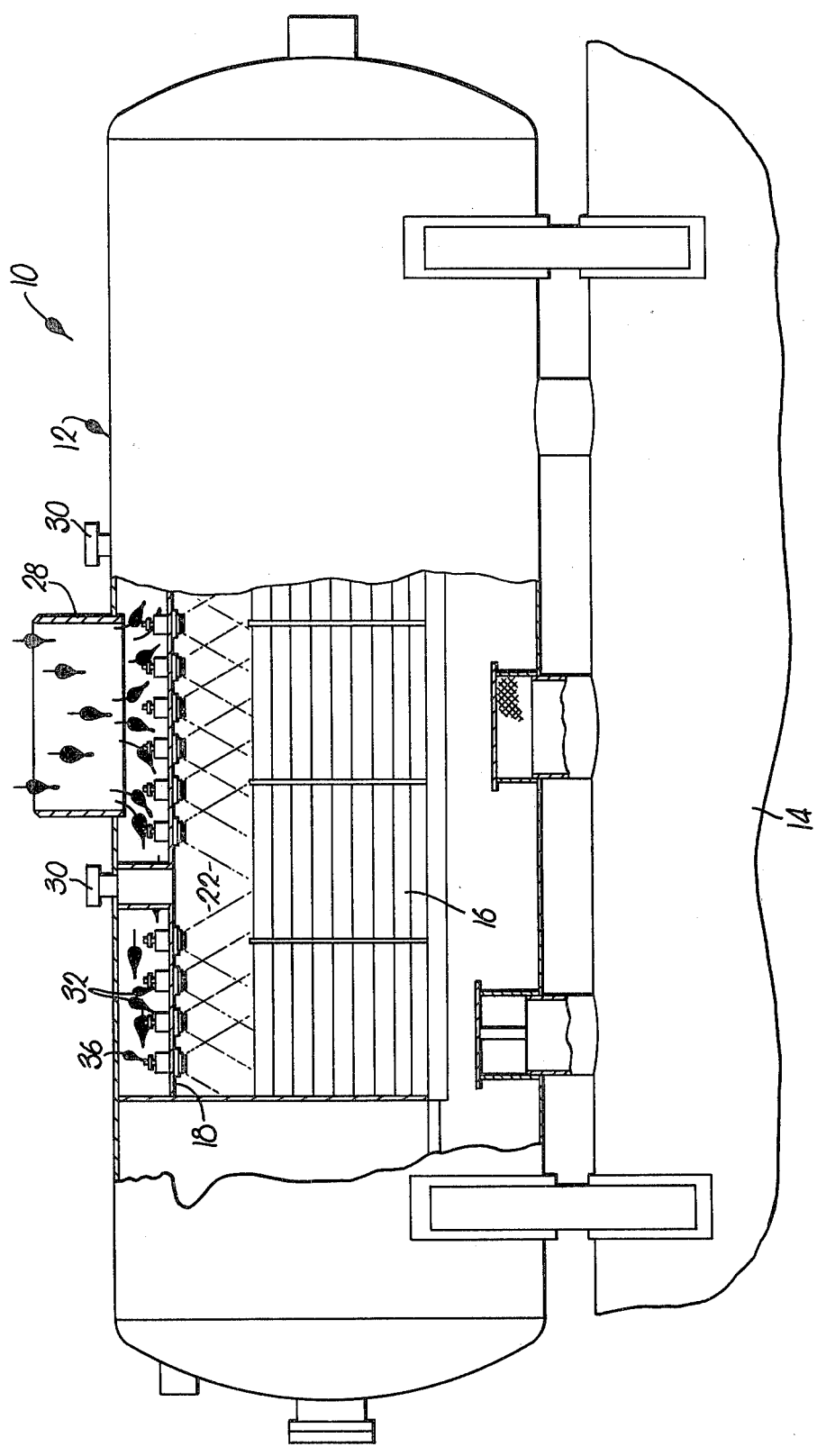

BOILER FEED WATER DEAERATOR SPRAY VALVE TURBULENCE SHIELD

This is a continuation-in-part of application Ser. No. 06/307,330 filed Oct. 1, 1981.

BACKGROUND OF THE INVENTION

1. Field of the Invention

The present invention is concerned with a boiler feed water deaerator having substantially vibration-free valve assemblies which give long-lived and trouble-free use. More particularly, it is concerned with such a deaerator wherein valve vibrations are reduced by virtue of an elongated, generally tubular, open ended valve shield for each valve configured to protect the movable components of the valve and reduce turbulence by directing water flow therethrough in a generally axial direction.

2. Description of the Prior Art

Corrosion in boiler equipment is caused by the presence of non-condensible gases such as oxygen and carbon dioxide, and by low pH values. The pH of boiler water can be raised chemically, but gases therein must be removed mechanically. Modern day high pressure boiler cycles have increased the need to protect the boiler components from corrosion. Indeed, a power plant boiler would deteriorate rapidly from the ravages of corrosion if non-condensible corrosion causing gases were not removed.

One established technique for deaeration of boiler water involves the use of a two-stage spray deaerator. In the first stage, incoming water flows from an inlet into an upper water box and thence through spray valves into a steam filled vented condensing chamber as thin walled, hollow cone spray patterns. The sprayed water then is dispersed in tray-type fill structure, and is collected in a lowermost basin. Latent heat transfer is essentially instantaneous because of the intimate water to steam exposure. As the water reaches the lower collection basin, at which point stage one is complete, water temperatures are within 2° F. of the counterflowing saturated steam temperature, and virtually all dissolved oxygen and free carbon dioxide have been separated from the water. The oxygen and carbon dioxide are carried by a small amount of uncondensed steam out through the vent, exiting as a plume.

In the second stage, the water flows to a scrubber section where it is turbulated in intimate contact with the counterflowing steam scrubbing out the last remaining quantity of non-condensibles. The water simultaneously falls into storage, in a heated and completely deaerated condition.

In the above type of deaeration device experience has demonstrated that removal of oxygen and other corrosion causing gases is maximized where, in the first stage, the liquid is sprayed in thin films in an essentially cone-type pattern. For this purpose, specific types of spray valves have been developed. One such valve which has enjoyed considerable commercial success employs a flanged, centrally apertured body with a shiftable, frustospherical valve plug located and supported for movement relative to the valve body. The valve opens under the influence of water pressure, and serves to create the fine cone-like spray desired for optimum deaeration.

In certain instances valves of the type described are subjected to rather severe vibrations which can shorten valve life. It has been discovered that, by virtue of the horizontal component of incoming water in such a unit, the valve structures are subjected to lateral loads tending to displace the valve and lead to undue vibrations or chattering of the movable valve components against the rigid body thereof. Moreover, as the water passes through the valve, turbulent flow patterns tend to create additional undesirable vibrations. The overall result of these forces is to substantially lessen valve life and to deleteriously alter the performance characteristics thereof.

SUMMARY OF THE INVENTION

The present invention overcomes the problems described above, and provides an improved valve assembly specifically useful in boiler water deaerators. Broadly speaking, a spray valve in accordance with the invention comprises an elongated, generally tubular body or shield presenting a passageway therethrough and an inlet and an outlet adjacent respective ends of the passageway. A shiftable valve plug is mounted adjacent the body outlet for movement of the plug between a flow-blocking position preventing discharge of water, and an open position spaced from the outlet permitting such discharge. Means such as a coil spring is provided for biasing the plug to its closed position, as is usual in valves of this type. The tubular body serves to effectively shield the valve components against undue lateral loads resulting from the horizontal force component of incoming water, with the result that vibrations are reduced and valve performance enhanced.

In order to achieve the most effective vibration reduction, it has been found that the ratio of the internal diameter of the valve body passageway to the length thereof should be up to about 2, and most preferably about 1. This serves to direct water entering the tubular body inlet substantially axially along the passageway prior to discharge thereof from the outlet, which in turn lessens water turbulence and resulting valve vibration.

The valve body outlet and plug are advantageously cooperatively configured so as to assure that the spray pattern from the valve is cone-like and relatively thin. For this purpose, the margin of the valve body passageway at the outlet is smoothly and outwardly curved, whereas the seating face of the plug is substantially frustospherical. A stem is secured to the plug and is located and supported within the confines of the tubular shield. Advantageously, the support structure is situated adjacent the upper inlet end of the shield and permits both axial reciprocation and limited pivoting of the shield and plug about an axis transverse to the longitudinal axis of the shield and proximal to the shield inlet.

Further, valves in accordance with the invention do not create unacceptably large pressure drops in water passing therethrough.

BRIEF DESCRIPTION OF THE DRAWINGS

FIG. 1 is a vertical sectional view of a boiler feed water deaerator in accordance with the invention;

FIG. 2 is an enlarged elevational view illustrating one of the valve assemblies depicted in FIG. 1:

FIG. 3 is a view similar to that of FIG. 2, but illustrates the valve assembly in an open, flow-permitting position;

FIG. 4 is a plan view of the valve assembly depicted in FIGS. 2-3;

FIG. 5 is a vertical sectional view taken along line 5—5 of FIG. 4 and illustrating the internal construction of the valve assembly;

FIG. 6 is a sectional view taken along line 6—6 of FIG. 5; and

FIG. 7 is a fragmentary side view illustrating the preferred deaerator construction in accordance with the invention.

DESCRIPTION OF THE PREFERRED EMBODIMENT

Turning now to FIGS. 1 and 7, a boiler feed water deaerator 10 is illustrated. The deaerator 10 is of two-stage construction and broadly includes a first stage vented condensing chamber tank 12 as well as an interconnected second stage chamber 14. Referring specifically to the first stage chamber 12, it will be seen that the chamber 12 is in the form of an elongated, generally horizontally disposed tank having therein conventional, tray-type feed water dispersing fill structure 16 extending along the length thereof. An elongated, preferably transversely arcuate and concavo-convex wall or plate 18 is likewise positioned within the chamber 12 and extends along the entire length of the latter. The plate 18, along with proximal wall surfaces within the tank, cooperatively define an upper incoming feed water box 20, and a feed water spray region 22 beneath the plate 18 and above water receiving structure 16 in the nature of a fill assembly. The region 22 is bounded on the sides thereof by respective, elongated, obliquely oriented sidewalls 24, 26. Although the invention has important use in a feed water deaerator as depicted in the drawings, it is to be understood that it is also equally useful in a deaerator where the water is sprayed into region 22, collected on a pan and then directed into a water-steam scrubber.

The plate 18 is provided with a series (here four) of rows of apertures therethrough, such rows extending substantially the entire length of the plate 18. The apertures serve to communicate the box 20 and region 22, and as best seen in FIG. 1, the respective rows of apertures are laterally spaced apart in order to provide full spray coverage as will hereinafter be explained.

The chamber 12 is further provided with a central upright water inlet 28 which is in communication with the inlet box 20 and serve to deliver water to the latter. Finally, the chamber 12 is provided with a plurality of upright steam vents 30 which serve to communicate the region 22 with the atmosphere, as is conventional in inlets of this type. A valve 32 is provided within the chamber 12 for each of the plate apertures, and serves to regulate water flow therethrough. Each of the valves 32 broadly includes an elongated, generally tubular and upright turbulence shield 34, and a shiftable valving arrangement including a valve plug 36. The shield 34 presents a central passageway 38, as well as an upper inlet 40 and a lower outlet 42. The shield is of metallic, integral construction and includes a pair of opposed, exterior, outwardly extending, apertured connection flanges 44 intermediate the ends thereof. The lowermost outlet end 42 of the shield is smoothly and outwardly curved as at 46 (see FIG. 5) in order to facilitate discharge of water therefrom without creation of turbulence.

The upper end of the shield 34 includes three equally spaced, inwardly extending, internal ribs 48 which are connected to and support a central annular collar or support ring 50. In the embodiment depicted, the ratio (L/D) of the length of passageway 38 to the diameter thereof is about 1, and this is preferred; however, this ratio can be up to about 2 in other contexts. It will also be seen that the internal diameter of the passageway 38 is substantially constant throughout the majority of the length thereof, and this is important for purposes which will be described.

The plug 36 includes an upper frusto-spherical seating surface 52 which is designed to complementally engage the curved lower margin 46 of the shield 34, when the valve 32 is closed. Moreover, this curved lower margin as well as the seating face 52 cooperatively creates a desirable cone-like thin spray pattern of water when the valve is opened.

An upright central stem 54 is secured to the plug 36 and extends upwardly therefrom as best seen in FIGS. 5 and 6 through the passageway 38 and ring 50. In this regard (see FIG. 6), it will be observed that the opening 56 defined by the ring 50 has a diameter which is substantially larger than the diameter of the stem 54; the importance of this feature will be made clear hereinafter. The uppermost end of stem 54 is threaded as at 58 and receives an annular, grooved, spring-engaging cap 60 as well as a nut 62. A coil spring 64 is likewise disposed about the stem 54, and is situated between the underside of cap 60 and the support ring and rib structure 50, 48. The spring 64 thus serves to bias the plug 36 to its closed position as illustrated in FIG. 2 where the seating face 52 is in firm engagement with the curved lower margin or surface 46 of the shield 34. In the use of the valves 32 in the context of deaerator 10, the valves are respectively mounted in association with a plate aperture. That is to say, as best seen in FIGS. 1-3, the plate 18 is mounted such that the convex face thereof is directly above the fill structure 16, whereas the valves are mounted so that they extend up through the opposed concave face thereof. In this regard, each valve 32 is positioned with the lower outlet end 42 of the shield 34 passing through the associated plate aperture. Conventional bolts 66 are employed, in conjunction with appropriate seals 68, to secure the overall valve 32 into position relative to the associated plate aperture (i.e., with the longitudinal axis of the shield 34 substantially coincident with the axis of the opening). Inasmuch as, in preferred forms, the transversely arcuate plate 18 is employed, it will be observed that the longitudinal axes of the respective valve shields are oriented at an angle with respect to the vertical (see FIG. 1).

During use of the deaerator 10, incoming water to be deaerated passes through the inlet 28 and is thence directed laterally along the length of the inlet box 20. It will be observed that a plurality of the valves 32, and thus the associated plate apertures, are horizontally spaced from the inlet 28. Thus, the incoming water (which may be under a slight pressure) has a horizontal component (illustrated by the arrows 70 of FIG. 7) which is directed against the valves. As noted above, such horizontal forces are believed to be a prime contributing factor to the vibration and chattering experienced with conventional deaerator valves. However, by virtue of the shields 34 provided with the valves 32 hereof, such undue vibration is largely eliminated, with the result that valve performance is measurably improved.

When incoming water reaches the respective valves 32, water pressure serves to open the valves against the bias of the coil springs 64. By virtue of the upright orientation and length of the valve shields 34, such entering water is directed generally axially down the length of the shield before encountering the valve plug 36. Water pressure against the plug 36 serves to shift the latter downwardly, with the result that a spray pattern of water from the outlet end 42 of each valve is created. As best seen in FIG. 1, the valves 32 are strategically located so as to provide full coverage across the upper face of fill structure 16.

It will thus be seen that the provision of tubular shield 34 not only is effective for protecting the valve plug 36 and stem 54 from the effects of the horizontal force components of incoming water, but also effectively dampens any turbulence in the water during travel thereof along the length of the shield. Moreover, this is accomplished without creation of large pressure drops across the valves.

It will also be seen that the movable components of each valve (i.e., the plug 36 and stem 54) are mounted for reciprocation axially of the shield 34, and also for pivoting movement thereof. Such pivoting can occur by virtue of the difference in diameter between the stem 54 and the adjacent support ring 50 (see FIG. 6), as well as the remainder of the described structure for operatively connecting the stem 54 to the ring 50. That is to say, the stem and plug are supported for pivoting movement thereof about an axis transverse to the longitudinal axis of the shield 34. This pivot axis is moreover proximal to the inlet end 40 of the shield 34, and it is thus remote from the plug 36. The resulting long lever arm between the pivot axis and plug 36 has been found to facilitate self-centering and compensation of the valve under turbulent water flow conditions, and is therefore preferred.

The overall operation of deaerator 10 serves to remove oxygen and other corrosion-causing gases from incoming feed water. In its general aspects, the operation of the deaerator 10 is well known, and need not be described in detail. However, the operation of the valves 32 does facilitate and enhance deaerator performance, and increases the useful life of the valves.

We claim:
1. A boiler feed water deaerator, comprising:
   an elongated, generally horizontally disposed tank;
   feed water receiving structure within said tank and extending along the length thereof;
   elongated wall means within said tank and extending along the length thereof above said water receiving structure for defining, with proximal wall surfaces within said tank, an incoming feed water box above the wall means, and a feed water spray region beneath the plate and above the water receiving structure,
   said wall means including structure defining a series of rows of apertures therethrough extending along the length of the wall means, said apertures serving to communicate said box and region;
   means defining a feed water inlet in communication with said box, at least certain of said apertures being horizontally spaced from said inlet;
   a valve for each of said apertures for regulating water flow therethrough, each of said valves including
   an elongated, generally tubular and upright turbulence shield defining a passageway therethrough, and an inlet and an outlet adjacent respective ends of the passageway;
   means mounting said turbulence shield on the face of said wall means remote from said region with the longitudinal axis of the shield being substantially aligned with the axis of the associated adjacent aperture;
   a valve plug;
   a stem secured to said plug and at least partially disposed within said shield and extending along the length thereof;
   means mounting the valve plug within said shield and adjacent said outlet thereof for movement of the plug between a flow-blocking position blocking communication between said box and region, and an open position communicating said box and region and permitting flow of water from the box, through the shield and associated aperture and into said region,
   said valve mounting means comprising structure adjacent said inlet end of said shield for supporting said plug and stem for reciprocal movement thereof axially of the shield, and for supporting the stem and plug for pivoting movement thereof about an axis transverse to the longitudinal axis of said shield and proximal to the inlet end of the shield; and
   means for biasing said plug to said flow-blocking position thereof,
   the ratio of the axial length of said shield to the internal diameter thereof being at least 1 for protecting said valve plug and stem from the effects of the horizontal component of incoming feed water from said inlet, and for directing water entering said shield inlet substantially axially along said passageway prior to discharge of water through said outlet, in order to lessen turbulence and valve plug vibration.

2. The deaerator as set forth in claim 1, said wall means comprising an elongated, transversely arcuate concavo-convex plate, said plate being located within said tank with the convex face thereof directly above said water receiving structure.

3. The deaerator as set forth in claim 2 each of said valve shields being mounted such that the longitudinal axis thereof is oriented at an angle with respect to the vertical.

4. The deaerator as set forth in claim 1, wherein said ratio is in the range of about 1 to about 2.

5. The deaerator as set forth in claim 4, said ratio being about 2.

6. The deaerator as set forth in claim 1, said plug mounting means comprising an annular support ring disposed substantially coaxially with and within the confines of said shield adjacent said inlet, said ring receiving said stem, the diameter of the opening defined by said ring being substantially larger than the diameter of said stem whereby to permit said pivoting movement of said plug and stem.

7. The deaerator as set forth in claim 6, said biasing means comprising a coil spring disposed about said stem and engaging said support ring.

8. The deaerator as set forth in claim 1, said shield mounting means comprising a pair of apertured mounting flanges secured to the outer surface of said shield and extending outwardly therefrom.

9. The deaerator as set forth in claim 1, the margin of said shield passageway at said outlet being smoothly and outwardly curved to facilitate spray discharge of water therefrom without creation of turbulence.

10. The deaerator as set forth in claim 9, said plug having a frustospherical setting face for complementally engaging said passageway margin.

11. The deaerator as set forth in claim 1, said shield being of substantially constant inner diameter through a majority of the length thereof.

* * * * *